United States Patent
Leaman

[15] 3,674,675
[45] July 4, 1972

[54] PLATINIZED PLASTIC ELECTRODES

[72] Inventor: Frank H. Leaman, 1613 N. Harrison Street, York, Pa. 17402

[22] Filed: July 9, 1970

[21] Appl. No.: 53,638

[52] U.S. Cl..............................204/290 R, 106/1, 117/47 A, 204/30, 204/290 F
[51] Int. Cl.........................................B01r 3/04, C23b 5/60
[58] Field of Search......................204/30, 20, 290 R, 290 F; 106/1; 117/47 A; 29/195

[56] References Cited

UNITED STATES PATENTS

| | | |
|---|---|---|
| 2,908,623 | 10/1959 | Doring, Jr. .....................204/290 R X |
| 3,099,608 | 7/1963 | Radovsky et al.....................204/30 X |
| 3,022,177 | 2/1962 | Fitch....................................204/30 X |
| 3,133,872 | 5/1964 | Miller et al. .....................204/290 F X |
| 3,235,473 | 2/1966 | Le Duc....................................204/30 |

Primary Examiner—John H. Mack
Assistant Examiner—Regan J. Fay
Attorney—Sherman and Shalloway

[57] ABSTRACT

A platinum coated electrode is provided with a platinum layer applied directly over a relative inert material such as polysulfone or materials similar thereto. This electrode can be advantageously used for plating metals from corrosive solutions and for other applications wherein a platinum inert electrode would be used.

4 Claims, No Drawings

PLATINIZED PLASTIC ELECTRODES

This invention relates to a platinized electrode comprising platinum applied to a relatively inert material, that is, either organic, ceramic or metallic in nature through chemical reduction or a similar technique. More specifically, this invention pertains to a position platinized electrode for plating metals from corrosive solutions which has a dense, coherent and inert layer of platinum on an inert material.

Platinum electrodes or platinum coated electrodes were first used for the electroplating of metals from corrosive solutions because these solutions were so corrosive in nature that an exceptionally insoluble and unreactive positive electrode was needed in order to prevent metallic contamination of the bath by dissolution of the positive electrode material. Many commercial plating techniques currently in use for the plating of noble metals currently require platinum or platinum coated positive electrodes.

Previously, electrodes were either composed completely of platinum, which is very expensive, or the electrodes were platinum coated electrodes over various materials such as tantalum, copper and other metals less noble than platinum. These latter electrodes have two advantages. First, they were less expensive than the completely platinum electrode, and second, the platinum could be plated onto the metal relatively easily. These electrodes, however, had the disadvantage that the platinum plated onto these other substrates was not always as electrically conductive or dense or as inert as a pure platinum electrode might be.

Briefly, the platinized electrode of this invention comprises a thin layer of platinum which has been chemically plated on an inert core material such as polysulfone, tetrafluoroethylene, polypropylene, procelains, glasses, aluminum oxides, etc.

The main advantage obtained from the platinum coated electrodes of this invention is, first, the improved economy which results from the employment of a minimum amount of platinum, and, second, the formation of a uniform layer of platinum that is as electrically conductive, dense and inert as a pure platinum electrode would be.

It is therefore a primary object of this invention to provide a positive electrode comprising a relatively inert and inexpensive core material and an electrically conductive, dense, uniform, adherent, and typically inert layer of platinum over the surface of this relatively inert and inexpensive core material.

It is a further object of this invention to provide an electrode that consists of a uniform and adherent platinum layer over a polysulfone core.

It is yet a further object of this invention to provide a platinized polysulfone positive electrode for use in plating metals from corrosive solutions.

Still further objects and advantages of this invention will be obvious from the more detailed description of this invention which follows:

The major steps involved in processing the platinum coated positive electrode of this invention are described as follows, using a polysulfone core as an example:

1. Molding the polysulfone core to the approximate size and shape desired.
2. Trimming the polysulfone core by mechanically removing sharp corners and edges.
3. Mechanically roughening the surface of the polysulfone core by tumbling with abrasive materials, by blasting the surface with abrasive material such as glass beads or sand, or by any other satisfactory technique.
4. Cleaning the surface of the polysulfone core in mild detergent solution.
5. Conditioning the surface of the polysulfone core for subsequent electroless platinum plating.
6. Sensitizing the surface of the polysulfone core for subsequent electroless platinum plating.
7. Activating the surface of the polysulfone core for subsequent electroless platinum plating.
8. Electroless platinum plating the surface of the polysulfone core.
9. Electrolytically platinum plating over the chemically deposited platinum, preferably to a total platinum thickness of 50–70 millionths of an inch.

By using the molding method of step 1, sizes and shapes heretofore unusable because of their prohibitive cost can now be used since polysulfone can easily be molded into any shape or size.

Step 2 is important because any sharp corners or edges would cause the platinum coating to become uneven at that point. This also removes the possibility of forming areas on the electrode which are subject to attack because of their geometry.

Steps 3 and 4 are preliminary preparations of the polysulfone surface for plating with the platinum. The mechanical roughening of the surface of the polysulfone core creates a surface which is more susceptible to forming an adherent bond between the polysulfone core and the platinum plated deposit. By cleaning the surface of the polysulfone core in a mild detergent solution, any impurities which may be present on the polysulfone core are quickly and easily removed. The core material must be cleaned before the electroless platinum plating operation can work effectively to form a dense, uniform and adherent platinum coating. Step 5 conditions the surface of the polysulfone core by preparing a non-conductive substrate on the polysulfone. This non-conductive substrate promotes the formation of strong chemical bonds which assures excellent adhesion of the platinum to the polysulfone core. This conditioning step is usually a two step operation although, depending on the core material, a one step conditioning may sometimes be used. The first conditioning step is a treatment with an organic liquid conditioner such as Enthonics Enplate SC–461 at a temperature of from 60°–90° F. followed by a treatment with a mixture of nitric and sulfuric acids with a wetting agent (Enplate Conditioner 470) at from 160°–165° F.

Step 6 is a sensitizing step which aids in forming an adhesive plating layer on the core. The polysulfone core is treated with a stannous chloride-hydrochloric acid solution mixed with a wetting agent. The wetting agent acts to reduce the surface tension on the polysulfone core and the acid stannous chloride provides a plurality of active tin sites on the non-conductive surface.

Step 7 activates the polysulfone core by replacing the active tin with palladium. This is accomplished by a slightly acidic solution of palladium chloride. The palladium then acts as a catalyst for the electroless deposition of any material which is catalyzed by palladium.

The electroless plating in step 8 of the platinum on the surface of the polysulfone core is carried out briefly as follows: First, the polysulfone core is placed in an electroless plating solution prepared by pouring a solution of chloroplatinic acid in ammonium hydroxide and water into a solution of hydrazine or hydrazine salts in water plus various other constituents, and the resulting solution is gradually heated for a period of one-half hour.

Where a thicker platinum plate is desired, the platinum plated electrode formed as above may be electrolytically platinum plated over the chemically deposited platinum plating to a thickness of 50–70 millionths of an inch by a conventional platinum plating electrolytic method. Since the electrode is now conductive, this can easily be done.

Electrical contacts may easily be put on the platinumized electrodes of this invention by attaching a conductive clip to the upper part of the electrode positioned so as to maintain the clip above the solution level, by the use of strips of conductive tape, or by fastening a relatively inert conductive strip or hook to the upper part of the electrode with conductive epoxy. By preparing the electrodes in this manner, the electrodes can then be used in any of the commercial plating processes now requiring platinum inert positive electrodes.

The following chemically inert and electrically non-conductive materials are representative of the materials useful as core of the novel electrodes of this invention: polysulfone, tetrafluoroethylene, polypropylene, various porcelains, glasses, aluminum oxides, etc.

As used in this invention "relatively chemically inert" means a compound which shows little reactivity toward most common chemical reagents and "electrically non-conductive" means the material is a good insulator.

Although the novel electrodes of this invention may be produced by plating with various electroless plating solutions, it is preferred to plate the inert core with an electroless plating bath containing a chloroplatinic acid-ammonium hydroxide complex, hydrazine or equivalents, water and various wetting and grain refining agents such as aminobenzenesulfonic acid, 2,7-napthalenedisulfonic acid, etc.

The chloroplatinic acid solution that is used to form the chloroplatinic acid-ammonium hydroxide complex is prepared as follows:

1. A pure platinum sponge is dissolved in aqua-regia and evaporated to dryness with low heat.
2. The chloroplatinic acid residue is repeatedly dissolved in distilled water followed by evaporation with low heat until nearly all free chloride ion is expelled.
3. The chloroplatinic acid salt is dissolved in distilled water to the desired concentration. This solution may be stored indefinitely until needed.

The process and product of this invention will now be illustrated by reference to the following specific examples. It is to be understood that such examples are presented for the purpose of illustration only, and the present invention is in no way deemed to be limited thereto. In the following examples, all parts are by weight and all temperatures are in degrees Centigrade.

EXAMPLE I

A piece of high purity aluminum oxide measuring $0.05 \times 1.6 \times 3$ was cleaned in mild detergent solution, water rinsed, immersed in concentrated hydrofluoric acid 1 minute, water rinsed, immersed in an acidic palladium chloride solution (Coppertech SS 390 Activator) three minutes, water rinsed, and electroless platinum plated in the following electroless platinum plating solution prepared by pouring Solution 2 into Solution 1 at room temperature and gradually heating the resultant solution at 70° C. over a period of 30 minutes.

Solution 1 — 10 cc. Chloroplatinic acid solution
(10G/L Pt) Free of excess Cl⁻
40 cc. Ammonium Hydroxide solution, concentrated
Solution 2 — 150 cc. Distilled water
30 drops 50 percent Hydrazine solution
16 drops 5 percent Nonyl phenol tergitol
NPX solution
0.08 g p-Aminobenzenesulfonic acid
0.08 g 2,7-naphthalenedisulfonic acid After deposition of platinum of the part terminated, the part was removed from the bath and rinsed. Electrical contact was made to the part and the part was plated in Bishop DNS No. 1 platinum plating bath at 1.2 amperes and 60° C. for 60 minutes. The total thickness of platinum on the part was 60–70 millionths of an inch. The resistivity on the plated part was 0.12 ohm per cm.

EXAMPLE II

The piece of platinumized aluminum oxide that was plated as given in Example I was used as a positive electrode in Bishop DNS No. 1 platinum plating bath for 60 minutes at 60° C. during which time a current of 2 amperes was employed for plating platinumized polysulfone parts. Following this treatment, the piece of platinumized aluminum oxide was examined for any damage that could be attributed to its use as a positive electrode in the manner described. No damage was observed other than a slight darkening in color of the platinum surface.

EXAMPLE III

A sample of P3510 polysulfone and a sample of P1700 polysulfone obtained from Union Carbide Corporation were each cut to dimensions of $0.1 \times 1.0 \times 2.5$, were trimmed so as to have rounded edges, and were sand blasted to a uniform matte finish. The samples were then cleaned in a mild detergent solution and were conditioned by immersing the polysulfone in an organic liquid solvent (Enplate SC–461) at room temperature for 3 to 10 minutes followed by two water rinses. The polysulfone was further conditioned by immersing in a nitric and sulfuric acid wetting agent solution (Enplate Conditioner 470) for 3 minutes at 160° F. followed by two cold water rinses. The polysulfone was then sensitized by immersing in a solution of 15 parts by volume of deionized water and 1 part by volume of an acidic stannous chloride wetting agent solution (Enplate Sensitizer 432) at room temperature for one minute followed by two cold water rinses. The polysulfone was then activated in a solution of 15 parts by volume of deionized water and one part by volume of an acidic palladium chloride solution (Enplate Activator 440 M) followed by two cold water rinses.

Platinum was then directly applied to the polysulfone samples simultaneously precisely according to the plating procedure given in Example I. After the platinum was deposited in this manner, the parts were water rinsed, dried, and checked by a voltmeter for resistivity. Resistivity of the P3510 sample was 3 ohms/cm. Resistivity of the P1700 sample was 10 ohms/cm.

Next, the chemically plated samples were plated singly in Bishop DNS No. 1 platinum plating solution at 625 ma and 60° C. for 20 minutes. The total thickness of platinum of the parts was 60–70 millionths of an inch. No cracking or peeling of the platinum deposits could be detected. The resistivity values for these platinumized polysulfone samples of P3510 polysulfone and P1700 polysulfone were 0.01 ohm/cm. and 0.04 ohms/cm., respectively.

EXAMPLE IV

The platinumized P3510 polysulfone sample plated in Example III was employed as a positive electrode in Engelhard No. 219 Rhodium plating solution at 40° C. to plate a polished brass cathode with a surface area of 5 in² for 45 minutes at 1 ampere. Contact was made to the platinumized anode by using a strip of platinum plated conductive tape. A total of 75 milligrams of rhodium was deposited on the brass part. The rhodium deposit was mirror bright. The platinumized polysulfone anode was not damaged in any respect by this treatment.

EXAMPLE V

The platinumized P1700 polysulfone sample plated in Example III was employed as a positive electrode in Bishop DNS No. 1 Platinum plating solution at 60° C. for 15 minutes to plate a brass component with a surface area of 50 in² at a current of 8 amperes. For conventional plating, such a small anode surface area is not recommended for plating such large objects, but such a test was made to examine the performance of the platinumized positive electrode under rugged conditions. To provide contact to the platinumized polysulfone anode, a strip of platinum plated conductive tape was placed along the upper part of the anode, to which tape a clip was fastened that carried the positive charge. The clip and tape were positioned just above the plating solution level.

Examination of the platinumized polysulfone anode after the plating trial showed that the platinum had not been loosened to any degree from the polysulfone. The surface of the platinum darkened considerably, but the resistivity of the platinumized polysulfone anode was less than 0.06 ohm/cm.

It is readily apparent from the above that the platinum plated electrodes of this invention have all the properties of a solid platinum electrode.

While the present invention has been described primarily with respect to the foregoing examples, it is to be understood

I claim:

1. A platinized electrode having a platinum coating on a non-metallic relatively chemically inert core produced by; sensitizing said core with with a stannous chloride-hydrochloric acid solution; activating said sensitized core with an acidic solution of palladium chloride; plating said activated core with platinum deposited from an electroless plating bath comprising a solution of chloroplatinic acid in ammonium hydroxide mixed with a reducing agent selected from hydrazine or hydrazine salts; and electrolytically plating a layer of platinum over said electroless layer to form a total platinum thickness of 50–70 millionths of an inch.

2. The platinized electrode of claim 1 wherein said core is selected from the group consisting of polypropylene, polysulfone, porcelains and aluminum oxide.

3. The platinized electrode of claim 2 wherein the core is aluminum oxide.

4. The platinized electrode of claim 2 wherein the core is polysulfone.

* * * * *